US012412704B2

(12) United States Patent
Yun et al.

(10) Patent No.: US 12,412,704 B2
(45) Date of Patent: Sep. 9, 2025

(54) MULTILAYER ELECTRONIC COMPONENT

(71) Applicant: SAMSUNG ELECTRO-MECHANICS CO., LTD., Suwon-si (KR)

(72) Inventors: Byung Kil Yun, Suwon-si (KR); Seok Hyun Yoon, Suwon-si (KR); Jin Woo Kim, Suwon-si (KR); In Ho Jeon, Suwon-si (KR); Bon Hyeong Koo, Suwon-si (KR); Se Yong Kim, Suwon-si (KR); Min Jung Jang, Suwon-si (KR); Geon Hoi Kim, Suwon-si (KR); Hyo Ju Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 150 days.

(21) Appl. No.: 18/224,709

(22) Filed: Jul. 21, 2023

(65) Prior Publication Data

US 2024/0242888 A1 Jul. 18, 2024

(30) Foreign Application Priority Data

Jan. 16, 2023 (KR) .................. 10-2023-0006101

(51) Int. Cl.
*H01G 4/30* (2006.01)
*H01G 4/12* (2006.01)

(52) U.S. Cl.
CPC ............. *H01G 4/30* (2013.01); *H01G 4/1227* (2013.01)

(58) Field of Classification Search
None
See application file for complete search history.

(56) References Cited

U.S. PATENT DOCUMENTS

| 2016/0194248 A1* | 7/2016 | Yoon .............. H01G 4/1227 501/137 |
| 2021/0202177 A1 | 7/2021 | Kurosu et al. |
| 2022/0199324 A1* | 6/2022 | Seo ................ H05K 1/181 |
| 2022/0199326 A1* | 6/2022 | Kim ................ C04B 35/62821 |

(Continued)

FOREIGN PATENT DOCUMENTS

| EP | 4 369 369 A1 | 5/2024 | |
| JP | 6629519 B2 * | 1/2020 | ......... C04B 35/4682 |

(Continued)

OTHER PUBLICATIONS

4) Effect of Acceptor (Mg) Concentration on the Resistance Degradation Behavior in Acceptor (Mg)-Doped BaTiO3 Bulk Ceramics: I. Impedance Analysis, Yoon et al., J. Am. Ceram. Soc. 92 [8] 1758-1765 (2009).

(Continued)

*Primary Examiner* — Dion R. Ferguson
(74) *Attorney, Agent, or Firm* — Morgan, Lewis & Bockius LLP

(57) ABSTRACT

A multilayer electronic component includes a body including a dielectric layer and internal electrodes; and an external electrode disposed on the body, wherein the dielectric layer includes a boundary portion, a region adjacent to a boundary with the internal electrode, and wherein the boundary portion includes a region satisfying an atomic ratio: $1.0\% \leq Sn/(Ba+Ti+Sn) \leq 1.5\%$.

17 Claims, 8 Drawing Sheets

(56) References Cited

U.S. PATENT DOCUMENTS

| | | | |
|---|---|---|---|
| 2022/0223344 A1* | 7/2022 | Jung | H01G 4/1227 |
| 2022/0230807 A1* | 7/2022 | Kim | H01G 4/232 |
| 2022/0238280 A1 | 7/2022 | Masuda | |
| 2022/0301770 A1* | 9/2022 | Lee | H01G 4/1227 |
| 2022/0375688 A1* | 11/2022 | Yoon | H01G 4/12 |
| 2023/0016359 A1* | 1/2023 | Shimada | H01G 4/012 |
| 2023/0145889 A1* | 5/2023 | Yoo | H01G 4/0085 |
| | | | 361/301.4 |
| 2024/0242888 A1* | 7/2024 | Yun | H01G 4/1227 |

FOREIGN PATENT DOCUMENTS

| | | | | |
|---|---|---|---|---|
| JP | 2022109873 A * | 7/2022 | | C04B 35/4682 |
| KR | 10-2022-0088099 A | 6/2022 | | |
| KR | 10-2022-0103601 A | 7/2022 | | |
| KR | 10-2022-0156269 A | 11/2022 | | |
| KR | 20230009286 A * | 1/2023 | | |
| WO | WO-2014024538 A1 * | 2/2014 | | H01G 13/00 |

OTHER PUBLICATIONS

5) Difference between resistance degradation of fixed valence acceptor (Mg) and variable valence acceptor (Mn)-doped BaTiO3 ceramics, Yoon et al., J. Appl. Phys. 108, 064101 (2010).
Extended European Search Report dated Nov. 26, 2024 issued in the corresponding European Patent Application No. 23187184.9.

* cited by examiner

MULTILAYER ELECTRONIC COMPONENT

CROSS-REFERENCE TO RELATED APPLICATION (S)

The present application claims the benefit of priority to Korean Patent Application No. 10-2023-0006101 filed on Jan. 16, 2023 in the Korean Intellectual Properties Office, the disclosure of which is incorporated herein by reference in its entirety.

1. Technical Field

The present disclosure relates to a multilayer electronic component.

2. Background

A multilayer electronic component (MLCC), a multilayer electronic component, may be a chip-type condenser mounted on the printed circuit boards of various electronic products such as imaging devices including a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and implemented with high-output, demand for miniaturization and high capacitance multilayer ceramic capacitors has increased.

Recently, as the automotive MLCC market requiring high reliability has expanded, demand for the automotive MLCCs has rapidly increased. Control of microcurrent may be important for automotive MLCCs, and high rated voltage and high reliability may be required as compared to the same capacitance so as to be driven in a harsh environment such as a high temperature environment, a high humidity environment, and an environment in which external shocks or vibrations are present.

To implement such an MLCC, various additive elements are added, and among the additive elements, valence fixed acceptors, valence variable acceptors, and rare earth elements may have a great influence on reliability. That is, it may be important to manufacture a chip having high reliability by optimizing the additive composition ratio of additive elements in the MLCC field. Moreover, even with the same dielectric composition, the variation in properties may be high depending on a microstructure, a degree of solidarity and distribution of elements, and process conditions, such that importance of optimal composition design may be high.

SUMMARY

An example embodiment of the present disclosure is to provide a multilayer electronic component having an improved dielectric constant at room temperature, an improved dielectric constant at high pressure, improved X7S properties, and improved MTTF at high temperature and high pressure.

According to an example embodiment of the present disclosure, a multilayer electronic component includes a body including a dielectric layer and internal electrodes; and an external electrode disposed on the body, wherein the dielectric layer includes a boundary portion, a region adjacent to a boundary with the internal electrode, wherein the boundary portion includes a region satisfying an atomic ratio: $1.0\% \leq Sn/(Ba+Ti+Sn) \leq 1.5\%$.

According to an example embodiment of the present disclosure, a multilayer electronic component includes a body including a plurality of dielectric layers and a plurality of internal electrodes; and external electrodes disposed on the body, wherein at least one of the plurality of dielectric layer includes a plurality of dielectric grains, and at least one of the plurality of dielectric grains includes a core-shell structure including a core portion and a shell portion covering at least a portion of the core portion, wherein the shell portion includes a region satisfying an atomic ratio: $0.5\% < Sn/(Ba+Ti+Sn) \leq 5.0\%$, and wherein a thickness of at least one of the plurality of dielectric layers is 2.1 μm or more and 2.5 μm or less.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
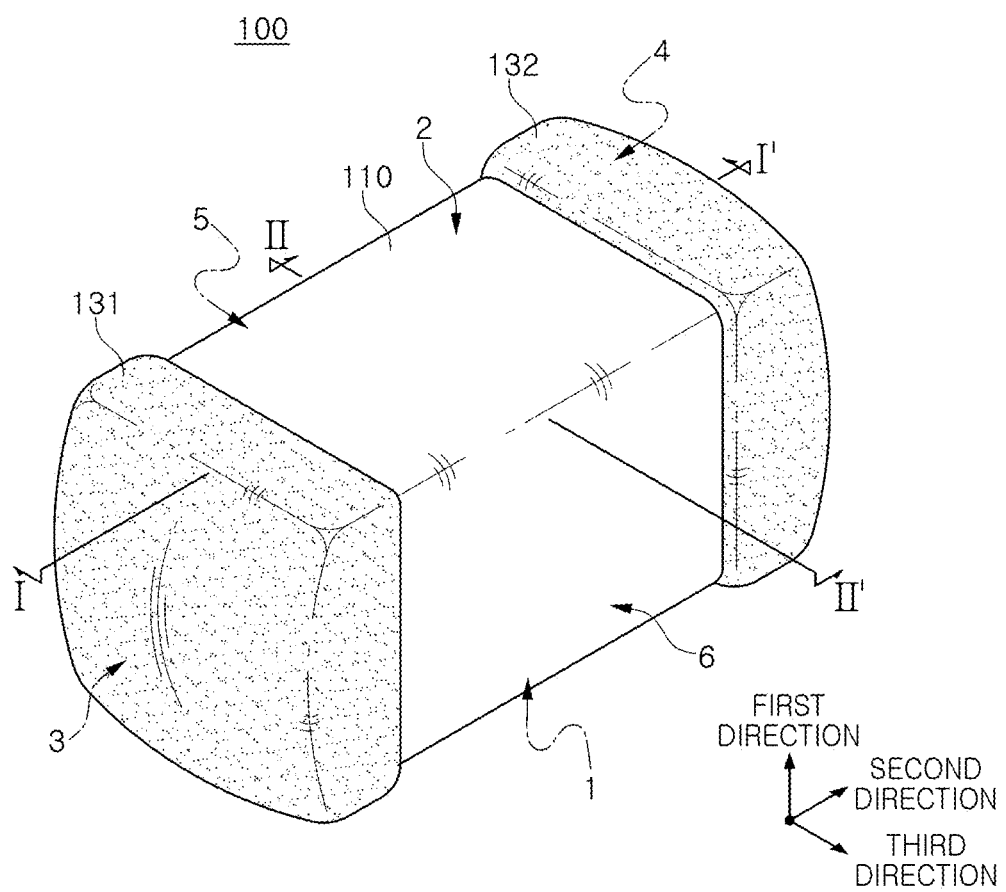
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, elements, portions or numbers, steps, operations, combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
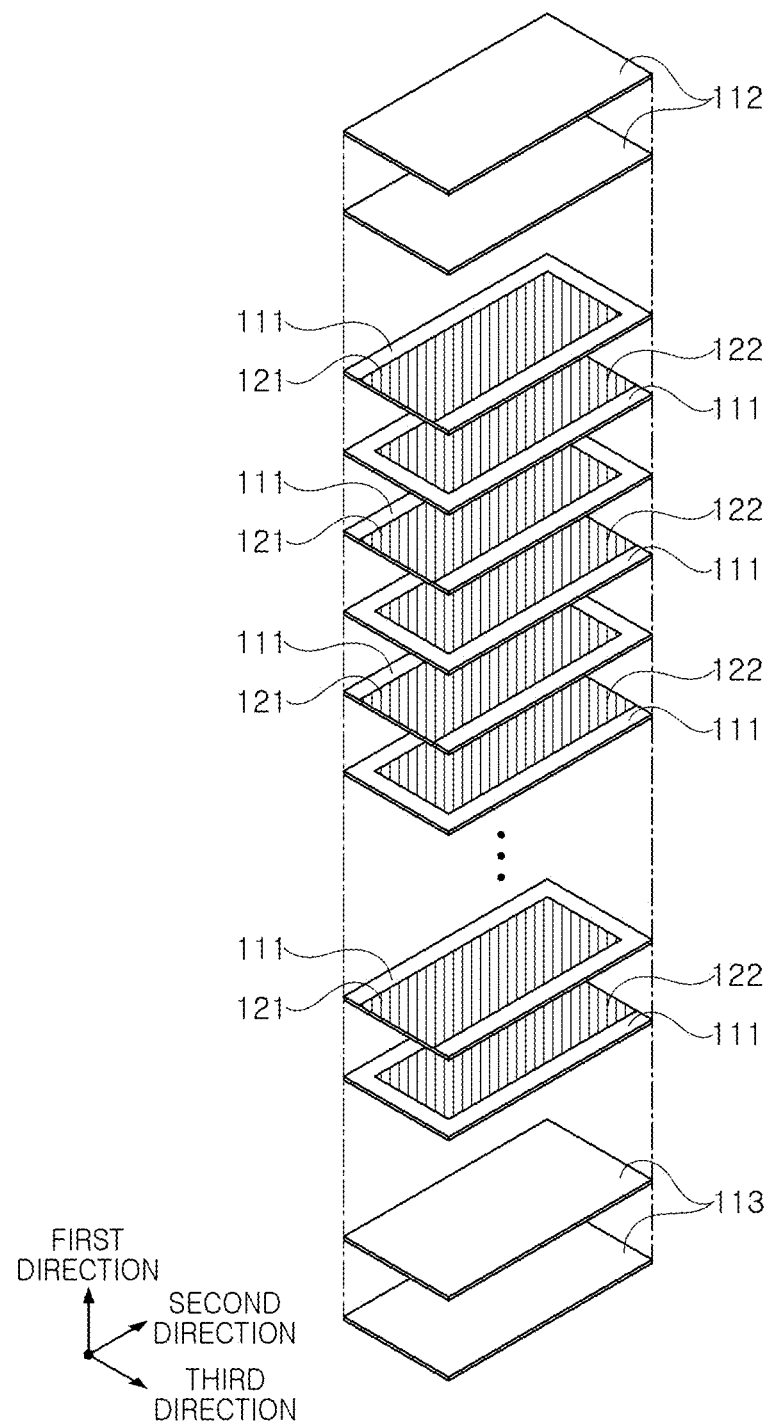
FIG. 2 is an exploded perspective diagram illustrating a laminate structure of internal electrodes according to an example embodiment of the present disclosure.

FIG. 2 is an exploded perspective diagram illustrating a laminate structure of internal electrodes according to an example embodiment.

Figure 3:
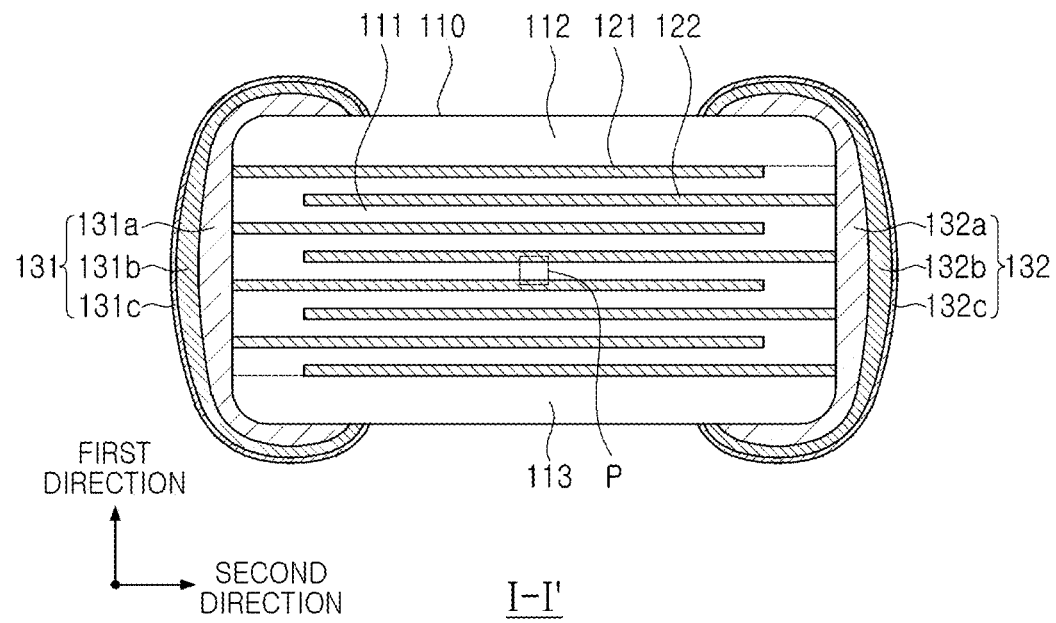
FIG. 3 is a cross-sectional diagram taken along line I-I' in FIG. 1.

FIG. 3 is a cross-sectional diagram taken along line I-I' in FIG. 1.

Figure 4:
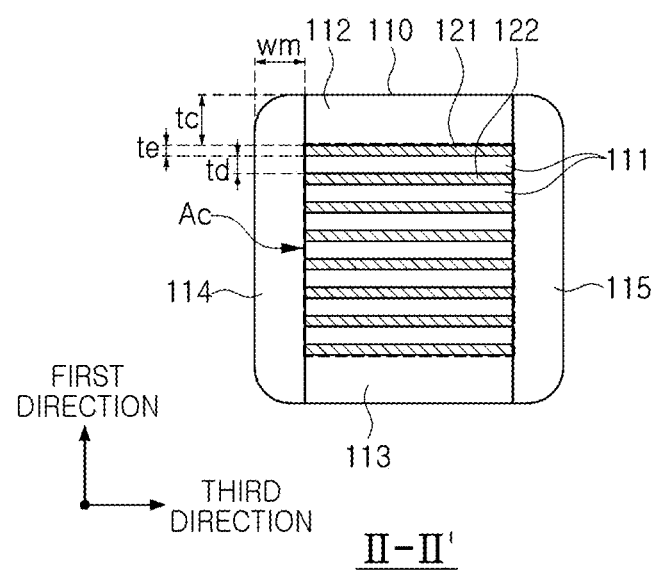
FIG. 4 is a cross-sectional diagram taken along line II-II' in FIG. 1.

FIG. 4 is a cross-sectional diagram taken along line II-II' in FIG. 1.

Figure 5:
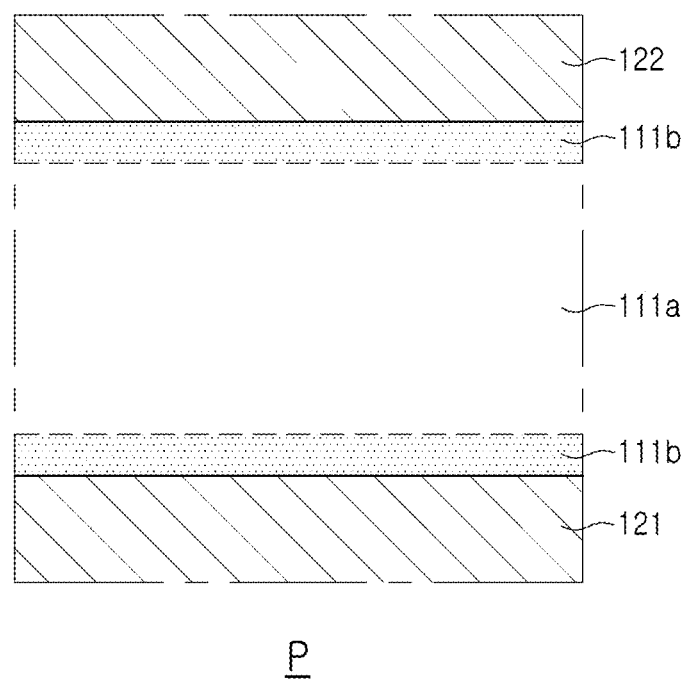
FIG. 5 is an enlarged diagram illustrating region P in FIG. 3.

FIG. 5 is an enlarged diagram illustrating region P in FIG. 3.

Figure 6:
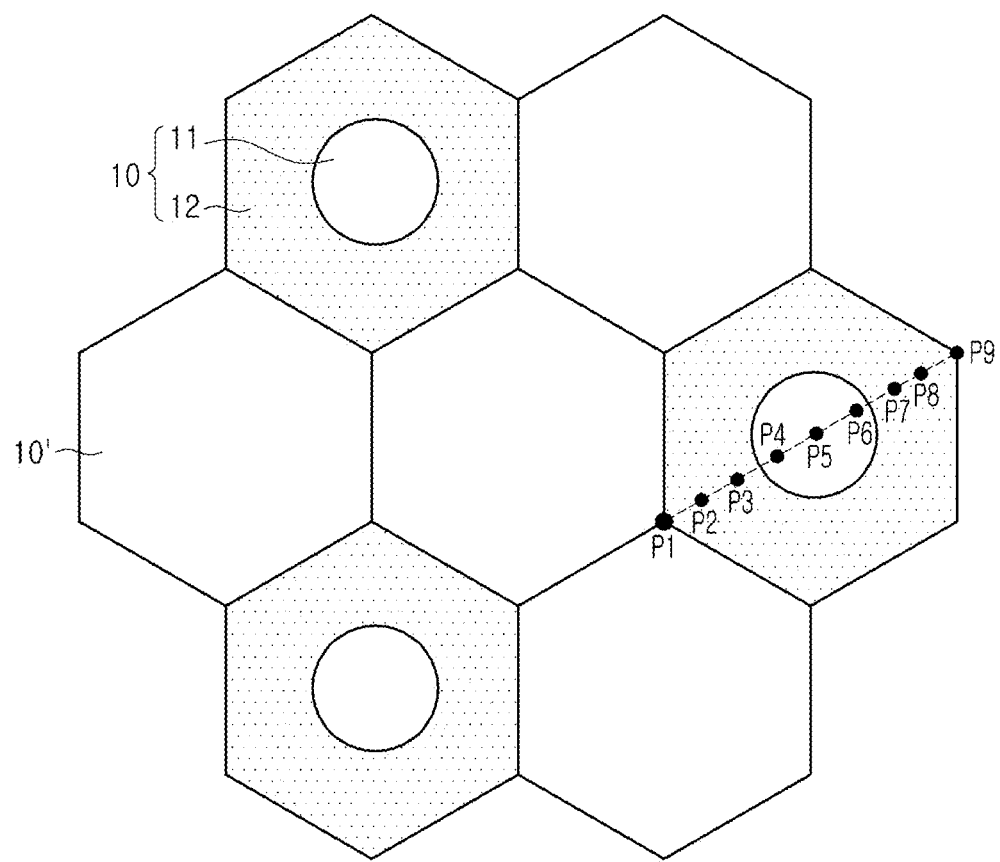
FIG. 6 is a diagram illustrating a structure of dielectric grains according to an example embodiment of the present disclosure.

FIG. 6 is a diagram illustrating a structure of dielectric grains according to an example embodiment.

Figure 7A:
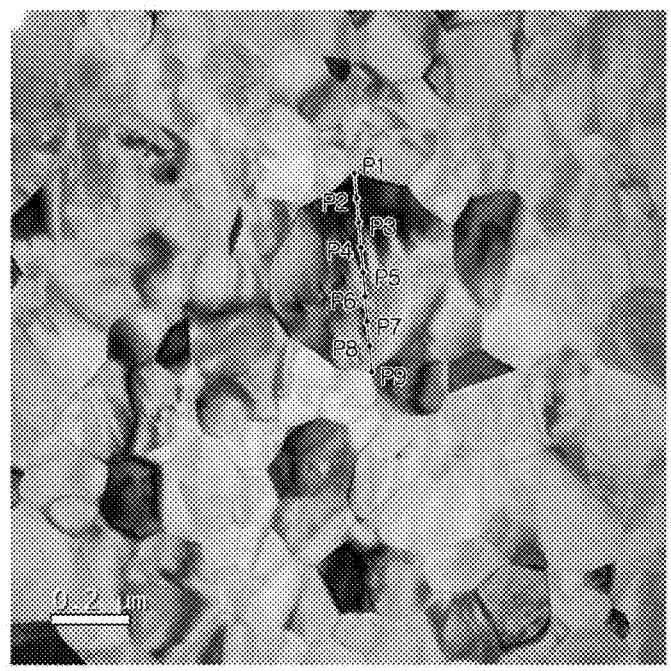
FIG. 7A is an image of a region in which a line profile is applied to dielectric grains.
Figure 7B:
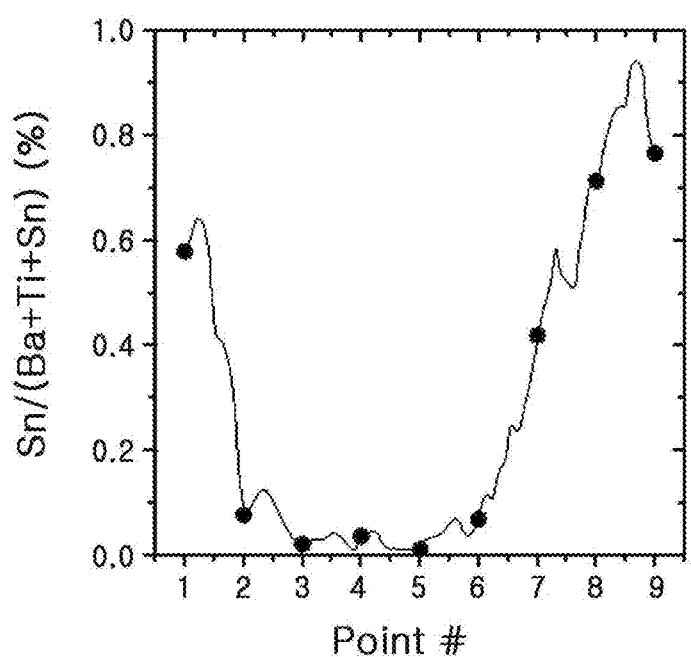
FIG. 7B is a graph illustrating a Sn content in a region to which a line profile is performed.

FIG. 7A is an image of a region in which a line profile is applied to dielectric grains. FIG. 7B is a graph illustrating a Sn content in a region to which a line profile is performed.

Figure 8A:
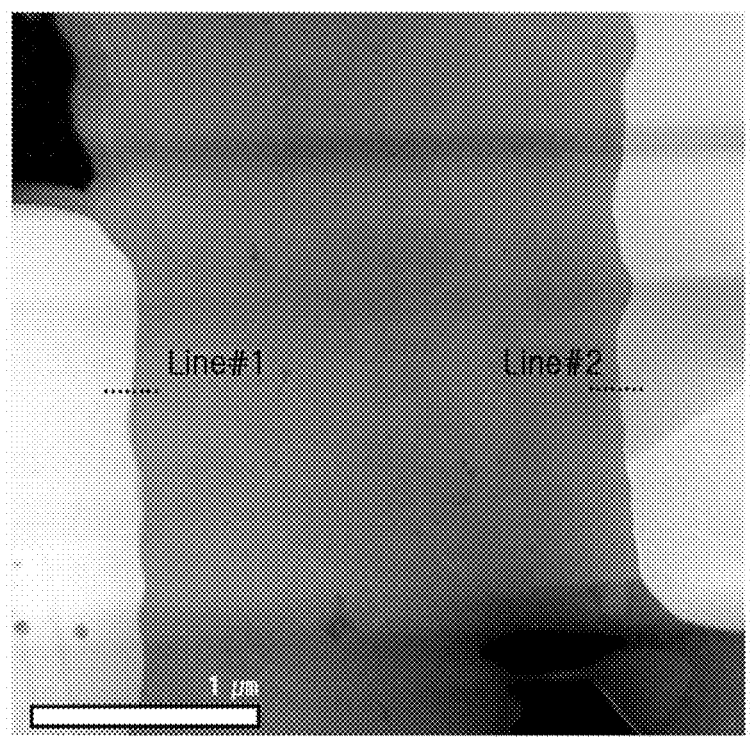
FIG. 8A is an image of a region in which a line profile is applied to dielectric grains.
Figures 8B, 8C:
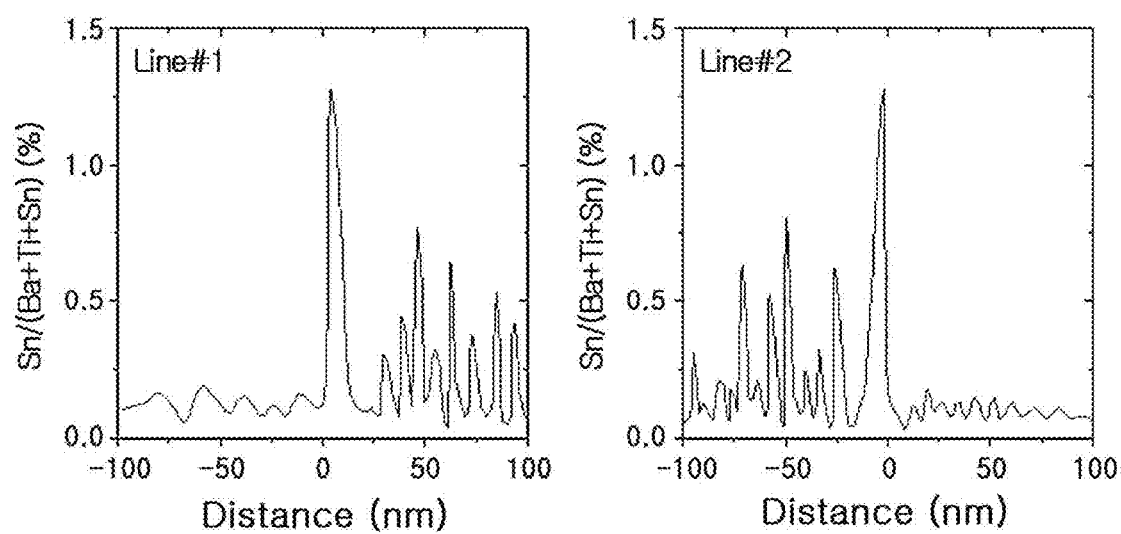
FIGS. 8B and 8C are a graph illustrating a Sn content in a region to which a line profile is performed.

FIG. 8A is an image of a region in which a line profile is applied to dielectric grains. FIGS. 8B and 8C are a graph illustrating a Sn content in a region to which a line profile is performed.

Figure 9:
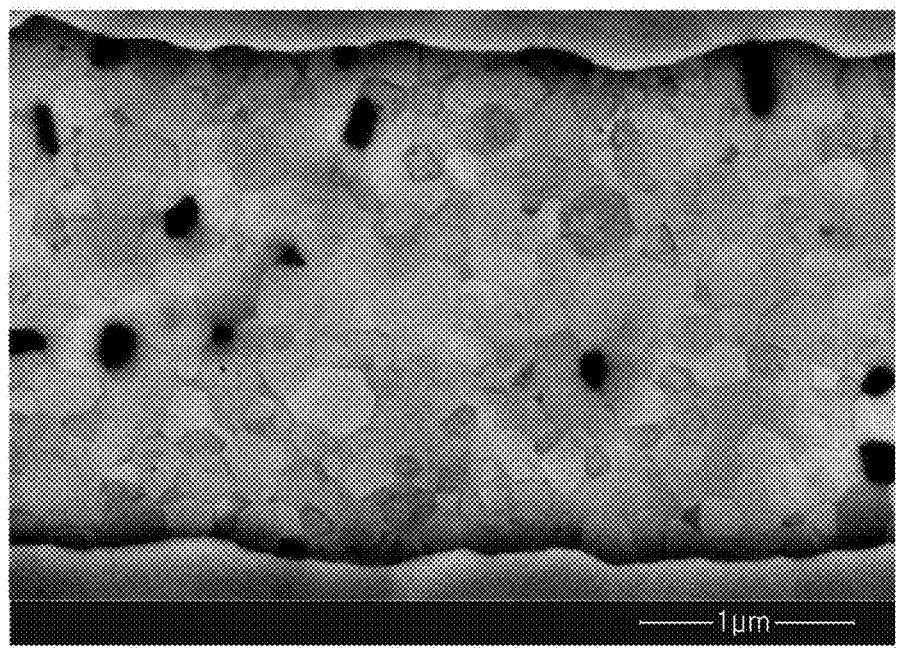
FIG. 9 is an image of a dielectric layer taken using a scanning electron microscope (SEM) according to an example embodiment of the present disclosure.

FIG. 9 is an image of a dielectric layer taken using an SEM according to an example embodiment.

Hereinafter, a multilayer electronic component according to an example embodiment will be described in greater detail with reference to FIGS. 1 to 9. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body 110 including dielectric layers 111 and internal electrodes 121 and 122; and external electrodes 131 and 132 disposed on the body 110, the dielectric layer 111 may include a boundary portion 111b, which is a region adjacent to a boundary with the internal electrodes 121 and 122, and the boundary portion 111b may include a region satisfying an atomic ratio: $1.0\% \leq Sn/(Ba+Ti+Sn) \leq 1.5\%$.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layers 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using an SEM.

A raw material for forming the dielectric layers 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

As the market for MLCC for IT and also MLCC for automotive electronics has expanded, demand for products having high rated voltage and excellent reliability in the same capacitance range has increased. Recently, as the automotive MLCC market requiring high reliability has expanded, the demand therefor has rapidly increased. Control of microcurrent may be important for the automotive MLCC, as it is necessary to drive in harsh environments such as temperature, humidity, external shock or vibration, high rated voltage and high reliability for the same capacitance may be necessary.

Generally, the smaller the size of the grains and the greater the number of grain boundaries, the better the reliability of the dielectric may be. Among MLCC dielectric composition additive elements, the effect of valence fixed acceptor, valence variable acceptor transition metal element, and rare earth element on reliability has already widely known, and generally, a condition with good reliability may be selected through optimization of the composition ratio of dielectric additive elements including these elements. While a base metal electrode (BME) MLCC has been industrialized, composition optimization work to improve reliability has been continuously conducted. However, even with the same dielectric composition, there may be a significant difference in reliability depending on the microstructure, the distribution and solid solution of additive elements, and process conditions.

The dielectrics of high-capacitance BME MLCCs such as the current X5R, X7R, X8R, and Y5V may be based on a material obtained by doping valence fixed acceptors such as Mg and Al and rare earth elements such as Y, Dy, Ho, and Er, which works as donor, in base materials such as $BaTiO_3$ or $(Ba,Ca)(Ti,Ca)O_3$, $(Ba,Ca)(Ti,Zr)O_3$ and $Ba(Ti,Zr)O_3$ in which Ca, Zr are partially dissolved, and adding additives such as valence variable acceptors such as Mn, V, and Cr, extra Ba, and $SiO_2$ or a sintering aid including the elements. Grain growth inhibition and reduction resistance may need to be implemented to realize normal capacitance and insulation properties of high-capacitance MLCC when fired in a reducing atmosphere, and the two effects may be realized by adding an appropriate amount of valence fixed acceptor such as Mg. However, when only a valence fixed acceptor such as Mg is added, the withstand voltage properties and reliability of the dielectric may not be good, and by adding a transition metal element, which is a valence variable acceptor such as Mn and V, and a rare earth element together, the effect of improving withstand voltage and reliability may be obtained. Most of these elements may be co-doped together, and may be employed in the shell region of the $BaTiO_3$ base material grain and may form a core-shell structure to realize stable capacitance properties and reliability depending on the temperature of MLCC. Accordingly, it may be expected that reliability may be good when these additive elements are not segregated while being included in the secondary phase and may need to be well dissolved in a $BaTiO_3$ crystal lattice of the shell region.

The multilayer electronic component 100 in an example embodiment may provide a dielectric composition having excellent properties while reducing the use of additives which may cause side effects in the development of MLCC for electric vehicles requiring excellent DC-bias properties and high reliability.

In an example embodiment, the dielectric layer 111 may include a boundary portion 111b, which is a region adjacent to a boundary with the internal electrodes 121 and 122.

More specifically, referring to FIG. 5, the dielectric layer 111 may include a boundary portion 111b, which is a region adjacent to the boundary between the internal electrodes 121 and 122, and a central portion 111a, which is a region not adjacent to the boundary with the internal electrodes 121 and 122. In other words, the dielectric layer 111 may include a central portion 111a and a boundary portion 111b.

In this case, the boundary portion 111b may include a region satisfying an atomic ratio: $1.0\% \leq Sn/(Ba+Ti+Sn) \leq 1.5\%$.

Here, each of Ba, Ti and Sn in $Sn/(Ba+Ti+Sn)$ may be the result of substituting the number of moles of an element detectable by a general measurement method or the value of atomic percentage (at %) of an element by EDS measurement.

Accordingly, according to some example embodiments, the multilayer electronic component comprising the dielectric layers may satisfy the following target properties: room temperature dielectric constant≥3000, DC-bias dielectric constant≥1000 at 7V/μm, $-22\% \leq \Delta C$ (TCC)≤+22% in a temperature range from −55° C. to 125° C., and MTTF≥100 hours under an accelerated test condition in which an electric field of 42 V/μm is applied at a temperature of 150° C. may be satisfied.

The boundary portion 111b may refer to a region within 30 nm from a boundary with the internal electrodes 121 and 122.

More specifically, when the dielectric layer 111 is disposed between the first internal electrode 121 and the second internal electrode 122, a region within 30 nm of the dielectric layer 111 from the boundary with the first internal electrode 121 toward the center of the dielectric layer 111 may be defined as a first boundary portion, and a region of the dielectric layer 111 within 30 nm from the boundary with the second internal electrode 122 toward the center of the dielectric layer 111 may be defined as a second boundary portion.

In the example embodiment, unless otherwise indicated, the description of the boundary portion 111b may include the description of the first boundary portion and the second boundary portion.

That is, a region satisfying an atomic ratio: $1.0\% \leq Sn/(Ba+Ti+Sn) \leq 1.5\%$ may be present in the dielectric layers 111 within 30 nm distance from each of the boundaries with the internal electrodes 121 and 122. In other words, the boundary portion may include a region satisfying an atomic ratio: $1.0\% \leq Sn/(Ba+Ti+Sn) \leq 1.5\%$.

Referring to FIGS. 8A to 8C, which describe an example embodiment, when the line profile analysis is performed through TEM at the boundary between the dielectric layer and the adjacent internal electrode, it may be confirmed that there is a point satisfying an atomic ratio: $1.0\% \leq Sn/(Ba+Ti+Sn) \leq 1.5\%$ in the region within 30 nm in the direction of the dielectric layer.

More specifically, referring to FIG. 8B in which line profile analysis was performed through TEM in the Line #1 region in FIG. 8A, −100 nm to 0 nm region may be an internal electrode, and 0 nm to +100 nm region may be a dielectric layer from the center point (0 nm) of Line #1 corresponding to the boundary between the internal electrode and the dielectric layer, and a peak shape satisfying an atomic ratio: $1.0\% \leq Sn/(Ba+Ti+Sn) \leq 1.5\%$ may be present in the region of 0 nm to +30 nm, which is the boundary portion.

Similarly, referring to FIG. 8C in which the line profile analysis was performed through TEM in the Line #2 region in FIG. 8A, −100 nm to 0 nm region may be a dielectric layer, 0 nm to +100 nm region may be an internal electrode from the central point (0 nm) of Line #2, which corresponds to the boundary between the dielectric layer and the internal electrode, and a peak shape satisfying $1.0\% \leq Sn/(Ba+Ti+Sn) \leq 1.5\%$ may be present in the region of −30 nm to 0 nm, which is the boundary portion.

Meanwhile, the dielectric layer 111 may include a plurality of dielectric grains, and at least one of the plurality of dielectric grains may include a core-shell structure including a core portion 11 and a shell portion 12 covering at least a portion of the core portion 11.

In other words, the dielectric grains may include dielectric grains 10 having the core-shell structure and dielectric grains 10' not having the core-shell structure.

Here, the core portion 11 may be defined as a region satisfying an atomic ratio: $0\% \leq Sn/(Ba+Ti+Sn) \leq 0.5\%$, more preferably, $0\% < Sn/(Ba+Ti+Sn) \leq 0.5\%$.

The shell portion 12 may be defined as a region satisfying an atomic ratio: $0.5\% < Sn/(Ba+Ti+Sn) \leq 5.0\%$, more preferably, the shell portion 12 may be defined as a region that satisfies an atomic ratio: $0.5\% < Sn/(Ba+Ti+Sn) \leq 1.0\%$.

A method of measuring the atomic percentage (at %) of each element included in the core portion 11 and the shell portion 12 will be described with reference to FIG. 6. The method may include, in one of dielectric grains 10, drawing the longest straight line among straight lines connecting one grain boundary and other grain system of dielectric grains 10, taking nine points P1 to P9 at equal distances, and analyzing the element content at each point using STEM-EDS.

More specifically, referring to FIG. 7, which is an example embodiment, in one dielectric grains 10, the atomic percentage (at %) of the elements included in nine equally spaced points P1 to P9 on the longest straight line connecting one grain system to another grain system may be measured using STEM-EDS device. In this case, points P2 to P7 satisfying an atomic ratio: $0\% \leq Sn/(Ba+Ti+Sn) \leq 0.5\%$ may be defined as the core portion 11, and points P1, P8, and P9 satisfying an atomic ratio: $0.5\% < Sn/(Ba+Ti+Sn) \leq 5.0\%$ may be defined as the shell portion 12.

In some embodiments, as the core portion 11 satisfies an atomic ratio: $0\% \leq Sn/(Ba+Ti+Sn) \leq 0.5\%$, or the shell portion 12 satisfies an atomic ratio: $0.5\% < Sn/(Ba+Ti+Sn) \leq 5.0\%$, the multilayer electric component comprising the dielectric layers may satisfy the following target properties: room temperature dielectric constant≥3000, DC-bias dielectric constant≥1000 at 7V/μm, −22%≤ΔC (TCC)≤+22% in a temperature range from −55° C. to 125° C., and MTTF≥100 hours under an accelerated test condition in which an electric field of 42 V/μm is applied at a temperature of 150° C.

Meanwhile, the average size of dielectric grains is not limited to any particular example, but may be, for example, 140 nm or more and 260 nm or less.

When the average size of dielectric grains is 140 nm or more and 260 nm or less, dielectric properties may be excellent, and sintering and grain growth may be easily controlled.

Here, the average size of the dielectric grains may be an average values of the sizes of dielectric grains present in the region when a random region of a dielectric layer, for example, a random 3 μm×4 μm (horizontal×vertical) region is observed through SEM. In this case, the size of the dielectric grains may correspond to the size of the longest straight line from one grain system to another grain system, and the average size of the dielectric grains may be calculated by averaging the sizes of the dielectric grains measured by the above method.

More specifically, referring to FIG. 9, which is an example embodiment, an image with a size of 3 μm×4 μm may be obtained through SEM of the center of an arbitrary dielectric layer located in the center of the body 110 in the first and second directions (cross-section), the size of dielectric grains present in the region may be measured, and the average value thereof may be calculated. The average size of the dielectric grains measured by the above method was 194.48 nm, the maximum grain size was 397.75 nm, the minimum grain size was 81.50 nm, and the standard deviation (Stdev) value was 63.00 nm. The coefficient of variation (CV) value (standard deviation/average) obtained by dividing the standard deviation value by the average value was 0.3220, which may indicate that the size distribution of dielectric grains was relatively uniform.

Since the size distribution of dielectric grains is relatively uniform, a multilayer electronic component having improved reliability may be provided.

The uniform size distribution of dielectric grains may be the result of facilitating control of grain growth by coating Sn on the surface of the $BaTiO_3$ parent particle, and by adding Sn, an effect of improving reliability may be obtained.

Also, the size of the core portion 11 is not limited to any particular example, but may be, for example, 120 nm or more and 160 nm or less.

The size of the core portion may correspond to the size of the longest straight line from one grain system to another grain system.

Generally, the size of the core portion 11 may be affected by the dielectric particle size of $BaTiO_3$, which is the base material powder before firing, and when using $BaTiO_3$ dielectric particles having a particle size of 100 nm class, it may be easily to control grain growth, and high reliability such s target dielectric and electrical properties may be satisfied.

Also, even when Sn is coated on the surface of the base material powder, it may not be easy to diffuse into the core portion 11, thereby improving reliability by controlling the appropriate Sn content of the shell portion 12 without degrading the dielectric properties.

In an example embodiment, the dielectric layer 111 may be formed using a dielectric composition, and the dielectric composition may include a $BaTiO_3$-based main component and a subcomponent.

Here, the dielectric composition may refer to a dielectric material before firing, and the dielectric layer 111 may refer to a dielectric material after firing.

Hereinafter, subcomponents which may be included in the aforementioned dielectric composition will be described in detail. The subcomponent described here will be described based on the amount of oxide or carbonate of the additive before firing, but, after sintering the dielectric composition, the subcomponent may be present in the form of a solid solution or elemental site substitution in a dielectric material, for example, $BaTiO_3$, rather than an oxide or carbonate form. The elemental content before and after firing may not have a large error value unless there are special circumstances, and it may be obvious to those skilled in the art that the content of elements in the chip state after firing may be measured by various methods such as SEM-EDS, TEM-EDS or STEM-EDS.

a) First Subcomponent

According to an example embodiment, the dielectric composition may further include a first subcomponent including at least one of an oxide or a carbonate of a valence variable acceptor element, and the valence variable acceptor element may include one or more of Mn, V, Cr, Fe, Ni, Co, and Zn, and the number of moles of the elements included in the first subcomponent may be 0.4 moles or more and 0.55 moles or less based on 100 moles of Ti.

The valence variable acceptor element included in the first subcomponent may improve firing temperature reduction and high-temperature withstand voltage properties of a multilayer electronic component to which a dielectric composition is applied.

When the number of moles of the elements included in the first subcomponent is less than 0.4 moles, the temperature properties may not satisfy X7S, and the mean time to failure (MTTF) may be less than 100 hours. When the number of moles of elements included in the first subcomponent exceeds 0.55 moles, the dielectric constant may decrease to 3000 or less.

b) Second Subcomponent

According to an example embodiment, the dielectric composition may further include a second subcomponent including at least one of an oxide or a carbonate of Mg, and the number of moles of the elements included in the second subcomponent may be 0.3 moles or more and 0.6 moles or less based on 100 moles of Ti.

Mg of the second subcomponent may increase high-temperature properties.

When the number of moles of the element included in the second subcomponent is less than 0.3 mole, the MTTF may be 100 hours or less. When the number of moles of elements included in the second subcomponent exceeds 0.6 moles, temperature properties may not satisfy X7S.

c) Third Subcomponent

According to an example embodiment, the dielectric composition may further include a third subcomponent including at least one of an oxide and a carbonate of a rare earth element, the rare earth element may include at least one of Y, Dy, Tb, Ho, Er, Gd, Ce, Nd, Sm, Tm, La, and Yb, and the number of moles of the element included in the third subcomponent may be 1.3 moles or more and 1.5 moles or less based on 100 moles of Ti. In this case, when there are two or more elements included in the third subcomponent, the value may refer to the sum of moles of two or more elements.

The rare earth element t included in the third subcomponent may improve high-temperature withstand voltage properties.

When the number of moles of elements included in the third subcomponent is less than 1.3 moles, the MTTF may decrease to less than 100 hours. When the number of moles of elements included in the third subcomponent exceeds 1.5 moles, the dielectric constant may decrease to 3000 or less.

e) Fourth Subcomponent

According to an example embodiment, the dielectric composition may further include a fourth subcomponent including at least one of an oxide of Si, a carbonate of Si, and a glass including Si, and the number of moles of the element included in the fourth subcomponent may be 2.15 moles or more and 3.15 moles or less based on 100 moles of Ti.

Si and Al included in the fourth subcomponent may improve dielectric constant and Dc-bias properties by improving firing density.

When the number of moles of elements included in the fourth subcomponent is less than 0.4 moles, temperature properties may not satisfy X7S. When the number of moles of elements included in the fourth subcomponent exceeds 0.55 moles, the dielectric constant may be 3000 or less.

Hereinafter, a method of measuring the content of each element included in the dielectric layer 111 will be described, but an example embodiment thereof is not limited thereto.

In the case of a non-destructive method, the components in the dielectric grains in the center of the chip may be analyzed using TEM-EDS. Among the cross-sections of the sintered body, a sliced analysis sample may be prepared in the region including the dielectric layer using a focused ion beam (FIB) device. Also, the damaged layer on the surface of the thinned sample may be removed using Ar ion milling, and mapping and quantitative analysis of each component may be performed in the image obtained using STEM-EDS. In this case, the quantitative analysis graph of each component may be obtained by mass fraction (wt %) of each element, which may be represented in terms of atomic percentage (at %) or mole fraction (mol %).

Also, in the case of the fracture method, the chip may be crushed, the internal electrode may be removed, a portion of the dielectric layer may be selected, and components of the selected dielectric layer may be analyzed using devices such as an inductively coupled plasma spectrometer (ICP-OES) and an inductively coupled plasma mass spectrometer (ICP-MS).

The thickness td of the dielectric layer 111 may not be limited to any particular example. Here, the thickness td of the dielectric layer 111 may mean the thickness td of at least one of the dielectric layers 111, and preferably the thickness td of all the dielectric layers 111.

However, to easily implement a reduced size and high capacitance of the multilayer electronic component 100, the thickness td of the dielectric layer 111 may be 3.0 µm or less. To easily obtain miniaturization and high capacitance of the multilayer electronic component, the thickness of the dielectric layer 111 may be 1.0 µm or less, preferably 0.6 µm or less, and more preferably 0.4 µm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized.

The internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The thickness te of each of the internal electrodes 121 and 122 may not need to be limited to any particular example. Here, the thickness te of the internal electrodes 121 and 122 may mean the thickness te of at least one of the first and second internal electrodes 121 and 122, preferably the thickness te of each of the first and second internal electrodes 121 and 122, and more preferably the thickness te of all the first and second internal electrodes 121 and 122.

However, to easily implement miniaturization and high capacitance of the multilayer electronic component 100, the thickness te of each of the internal electrodes 121 and 122 may be 1.0 µm or less. To more easily obtain miniaturization and high capacitance of the multilayer electronic component, the thickness of the internal electrodes 121 and 122 may be 0.6 µm or less, more preferably 0.4 µm or less.

Here, the thickness te of each of the internal electrodes 121 and 122 may refer to the size of the internal electrodes 121 and 122 in the first direction. Also, the thickness te of each of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first and second directions using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized.

Meanwhile, in an example embodiment, the average thickness td of at least one of the plurality of dielectric layers 111 and the average thickness te of at least one of the plurality of internal electrodes 121 and 122 may satisfy 2×te<td.

In other words, the average thickness td of one dielectric layer 111 may be greater than twice the average thickness te of one internal electrode 121 or 122. Preferably, the average thickness td of the plurality of dielectric layers 111 may be greater than twice the average thickness te of the plurality of internal electrodes 121 and 122.

Generally, a reliability issue due to a decrease in a breakdown voltage (BDV) in a high voltage environment may be problematic in electronic components for high voltage electric vehicles.

Accordingly, to prevent a decrease in breakdown voltage under a high voltage environment, by configuring the average thickness td of the dielectric layer 111 larger than twice the average thickness te of the internal electrodes 121 and 122, the thickness of the dielectric layer, which is the distance between the internal electrodes, may be increased, and breakdown voltage properties may improve.

When the average thickness td of the dielectric layer 111 is less than twice the average thickness te of the internal electrodes 121 and 122, the average thickness of the dielectric layer, which is the distance between the internal electrodes, may be thin such that breakdown voltage may be reduced, and a short circuit between internal electrodes may occur.

In a high voltage electronic component, an average thickness te of internal electrodes may be 1 µm or less, and an average thickness td of a dielectric layer may be 3.0 µm or less, but an example embodiment thereof is not limited thereto.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacitance of multilayer electronic components, the thickness tc of the cover portions 112 and 113 may be 100 µm or less, preferably 30 µm or less. More preferably, the thickness may be 20 µm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image.

Also, the average size of the cover portion in the first direction measured by the above method may be substantially the same as the average size of the cover portion in the first direction in the cross-sections of the body 110 in the first and third directions.

The multilayer electronic component 100 may include side margin portions 114 and 115 disposed on both end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110.

As illustrated, the side margin portions 114 and 115 may refer to a region between both end-surfaces of the first and second internal electrodes 121 and 122 in the third direction and the boundary surface of the body 110 with respect to the cross-section of the body 110 in the first and third directions, respectively.

The side margin portions 114 and 115 may be formed by forming the first and second internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may basically prevent damages to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

Meanwhile, the width wm of each of the first and second side margin portions 114 and 115 may not need to be limited to any particular example.

However, to easily obtain miniaturization and high capacitance of the multilayer electronic component 100, the width wm of each of the side margin portions 114 and 115 may be 100 μm or less, preferably 30 μm or less, and may be more preferably 20 μm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115, and the average size of the side margin portions 114 and 115 in the third direction.

The average size of the side margin portion 114 and 115 in the third direction may be measured by scanning a cross-section of the body 110 in the first and third directions using a scanning electron microscope (SEM) with a magnification of 10,000. More specifically, the average size may be an average value measured from the size in the third direction at 30 points spaced apart from each other by an equal distance in the first direction in the scanned image of one of the side margin portions.

In an example embodiment, the ceramic electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the internal first and second electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material used for forming the external electrodes 131 and 132 may be determined in consideration of electrical properties and structural stability, and the external electrodes 131 and 132 may have a multilayer structure.

For example, the external electrodes 131 and 132 may include electrode layers 131a, 132a, 131b, and 132b disposed on the body 110 and plating layers 131c and 132c disposed on the electrode layers 131a, 132a, 131b, and 132b, respectively.

For a more specific example of the electrode layers 131a, 132a, 131b, and 132b, the electrode layers 131a, 132a, 131b, and 132b may be sintered electrodes including a first conductive metal and glass, or a second conductive metal and resin.

Here, the first conductive metal may refer to a conductive metal included in the first electrode layers 131a and 132a, and the second conductive metal may refer to a conductive metal included in the second electrode layers 131b and 132b. In this case, the first conductive metal and the second conductive metal may be the same or different, and may include the same metal material, but an example embodiment thereof is not limited thereto.

Also, the electrode layers 131a, 132a, 131b, and 132b may have a form in which a plastic electrode and a resin-based electrode are formed in order on the body.

Also, the electrode layers 131a, 132a, 131b, and 132b may be formed by transferring a sheet including a conductive metal onto a body or by transferring a sheet including a conductive metal onto a fired electrode.

A material having excellent electrical conductivity may be used as the conductive metal included in the electrode layers 131a, 132a, 131b, and 132b. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto.

In an example embodiment, the first and second external electrodes 131 and 132 may have a two-layer structure including first electrode layers 131a and 132a and second electrode layers 131b and 132b, respectively, and accordingly, the external electrodes 131 and 132 may include first electrode layers 131a and 132a including a first conductive metal and glass, and second electrode layers 131b and 132b disposed on the first electrode layers 131a and 132a and including a second conductive metal and resin.

The first electrode layers 131a and 132a may include glass, thereby improving bonding with the body 110, and the second electrode layers 131b and 132b may include resin, thereby improving bending strength.

The conductive metal used in the first electrode layers 131a and 132a is not limited to any particular example as long as the metal may be electrically connected to the internal electrodes 121 and 122 to form capacitance. For example, the metal may include one or more selected from a group consisting of nickel (Ni), copper (Cu), palladium (Pd), silver (Ag), gold (Au), platinum (Pt), tin (Sn), tungsten (W), titanium (Ti) and alloys thereof. The first electrode layers 131a and 132a may be formed by applying a conductive paste prepared by adding glass frit to the conductive metal powder and firing the powder.

The conductive metal included in the second electrode layers 131b and 132b may serve to be electrically connected to the first electrode layers 131a and 132a, respectively.

The conductive metal included in the second electrode layers 131b and 132b is not limited to any particular example as long as the metal may be electrically connected to the electrode layers 131a and 132a, and may include one or more selected from a group consisting of nickel (Ni), copper (Cu), palladium (Pd), silver (Ag), gold (Au), platinum (Pt), tin (Sn), tungsten (W), titanium (Ti) and alloys thereof.

The conductive metal included in the second electrode layers 131b and 132b may include at least one of spherical particles and flake particles. That is, the conductive metal may consist of only flake-shaped particles, only spherical particles, or may be a mixture of flake-shaped particles and spherical particles. Here, the spherical particle may also include a shape not perfectly spherical, and may include a shape in which, for example, a length ratio between a major axis and a minor axis (long axis/short axis) is 1.45 or less. The flake-shaped particle may refer to a particle having a flat and elongated shape, and is not limited to any particular example, but, for example, the length ratio of the major axis to the minor axis (long axis/short axis) may be 1.95 or more. The lengths of the major and minor axes of the spherical particles and the flake-shaped particles may be measured from images obtained by scanning cross-sections in the first and second directions, cut-out at the center of the ceramic electronic component in the third direction, using a scanning electron microscope (SEM).

Resin included in the second electrode layers 131b and 132b may secure bonding properties and may absorb impact. The resin included in the second electrode layers 131b and 132b is not limited to any particular example as long as the region may have bonding properties and impact absorption and may be mixed with conductive metal powder to form a paste, and may include, for example, an epoxy resin.

Also, the second electrode layers 131b and 132b may include a plurality of metal particles, an intermetallic compound, and a resin. As the intermetallic compound is included, electrical connectivity with the first electrode layers 131a and 132a may be improved. The intermetallic compound may improve electrical connectivity by connecting a plurality of metal particles, and may surround a plurality of metal particles and may connect the metal particles to each other.

In this case, the intermetallic compound may include a metal having a melting point lower than the curing temperature of the resin. That is, since the intermetallic compound includes a metal having a melting point lower than the curing temperature of the resin, the metal having a melting point lower than the curing temperature of the resin may be melted during a drying and curing process, and may form a intermetallic compound with portion of the metal particles and may enclose the metal particle. In this case, the intermetallic compound may preferably include a metal having a low melting point of 300° C. or less.

For example, Sn having a melting point of 213 to 220° C. may be included. During the drying and curing process, Sn may be melted, and the molten Sn may wet high-melting-point metal particles such as Ag, Ni, or Cu by capillarity, and may react with a portion of the Ag, Ni, or Cu metal particles, such that an intermetallic compound such as $Ag_3Sn$, $Ni_3Sn_4$, $Cu_6Sn_5$, and $Cu_3Sn$ may be formed. Ag, Ni or Cu not having participated in the reaction may remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131c and 132c may improve mounting properties. The type of the plating layers 131c and 132c is not limited to any particular example, and single-layer plating layers 131c and 132c including at least one of nickel (Ni), tin (Sn), palladium (Pd), and alloys thereof, and may include a plurality of layers.

For a more specific example of the plating layers 131c and 132c, the plating layers 131c and 132c may be Ni plating layers or Sn plating layers, and Ni plating layers and Sn plating layers may be formed in order on the electrode layers 131a, 132a, 131b, and 132b, and a Sn plating layer, a Ni plating layer, and a Sn plating layer may be formed in order. Also, the plating layers 131c and 132c may include a plurality of Ni plating layers and/or a plurality of Sn plating layers.

Although the example embodiments have been described in detail above, the example embodiment is not limited by the above-described embodiments and the accompanying drawings, but is limited by the appended claims. Accordingly, various forms of substitution, modification, and change may be made by those skilled in the art within the scope of the technical spirit of the present disclosure described in the claims, which also falls within the scope of the present disclosure.

Hereinafter, the example embodiment will be described in greater detail through experimental embodiments, but the scope of the present disclosure is not limited to the experimental embodiments.

Embodiment $BaTiO_3$ powder having an average particle size of 100 nm was used as the base material for the main component, and Sn was doped on the edge of the powder. Sn doping allowed various sample chips to be manufactured by varying the content within the range of 0 to 2.0 mol when $BaTiO_3$, the main component, was 100 mol.

Using zirconia beads as a mixing/dispersing medium, additive raw material powders containing subcomponents corresponding to the compositions specified in Table 1 and $BaTiO_3$ powders doped with Sn at the edges thereof were mixed with ethanol/toluene solvents and dispersants, milling was performed for 10 hours, and the binder was mixed, and additional milling was performed for 10 hours. The prepared slurry was prepared into molded sheets having thicknesses of 3.0 μm, 3.1 μm, 3.2 μm, and 3.3 μm using a sheet forming machine. Ni inner electrodes were printed on the molded sheet. The upper and lower cover portions were manufactured by laminating 36 layers of 3.0 μm thick cover sheets, 415 layers (thickness: 3.1 μm), 410 layers (thickness: 3.2 μm), and 405 layers (thickness: 3.3 μm) of printed active sheets are pressed and laminated for each sheet thickness, thereby manufacturing a bar. The compression bar was cut into chips having a size of 2012 (length×width, 2.0 mm×1.2 mm) using a cutting machine. The manufactured 2012 size MLCC chip was calcinated, was fired in a reducing atmosphere of 0.3% $H_2$/99.7% $N_2$ ($H_2O/H_2/N_2$ atmosphere) at a temperature of 1150 to 1200° C. for a holding time of 2 hours, and was re-oxidized for 3 hours in a $N_2$ atmosphere at 1060° C. Here, the 0.3% $H_2$ concentration corresponds to the condition of the electromotive force of 741 mV in the oxygen partial pressure meter. A termination process and electrode firing were performed with Cu paste on the fired chip, thereby forming an external electrode. Accordingly, an MLCC chip of size 2012 having a dielectric thickness of about 2.1 to 2.5 μm and a number of dielectric layers of 415 to 405 after firing was manufactured.

The room temperature capacitance C and dissipation factor DF of the MLCC Chip were measured using an LCR meter under the conditions of 1 kHz and AC 0.5 V/μm. The dielectric constant of the MLCC chip dielectric was calculated from the capacitance, dielectric thickness, internal electrode area, and number of layers of the MLCC chip.

Room temperature insulation resistance was measured after 60 seconds in a state in which 10 samples were taken and DC 10 V/μm was applied. The change in capacitance with temperature was measured in the temperature range of −55° C. to 125° C. For the highly accelerated life time test (HALT), a voltage corresponding to an electric field of 42 V/μm was applied to 40 specimens for each type at 150° C., and the failure time was measured to calculate the mean time to failure (MTTF). Tables 2, 4 and 6 list the properties of the prototype chips corresponding to the embodiments specified in tables 1, 3 and 5.

In this embodiment, a dielectric for realizing the entirety of these properties, such as high capacitance, X7S capacitance-temperature (TCC) properties, and high high-temperature reliability, in a reducing atmosphere firing condition to which Ni internal electrodes may be applied, and an MLCC chip to which the same is applied may be implemented.

As a properties criterion for this, properties of room temperature dielectric constant≥3000, DC-bias dielectric constant≥1000 at 7V/μm, −22%≤ΔC (TCC)≤+22% in a temperature range from −55° C. to 125° C., and MTTF≥100 hours under an accelerated test condition in which an electric field of 42 V/μm is applied at a temperature of 150° C. was targeted, and the sample satisfying the entirety of the above properties was marked as O in the properties evaluation, and the sample not satisfying even one of the properties was marked as X.

The added content of each element was represented based on the number of moles, and refers to the number of moles of the added element based on 100 moles of the $BaTiO_3$ base material. For example, in embodiment 1-1, Mn and V, which are the first subcomponents, are described as 0.2 mol and 0.25 mol, respectively, which may indicate that 0.2 mol of Mn was added to 100 mol of $BaTiO_3$, that is, 0.2 mol of V was added to 100 mol of Ti and 0.2 mol of V was added to 100 mol of Ti.

The Sn content may refer to the value of the atomic ratio Sn/(Ba+Ti+Sn), and the boundary portion may refer to a region within 30 nm from a boundary with the internal electrode in the dielectric layer.

The sample in which the Sn content of the boundary portion satisfied 1.0% to 1.5% was marked as O, and the sample not satisfying the content was marked as X. Also, the sample in which the Sn content of the shell portion satisfied greater than 0.5% and 1.0% or less was marked as O, and the sample not satisfying the content was marked as X.

TABLE 1

| Embodiment | Firing atmosphere EMF (mV) (@850° C.) | Main component $BaTiO_3$ | Content of doped Sn | First subcomponent Mn | First subcomponent V | Second subcomponent Mg | Third subcomponent Dy | Fourth subcomponent Tb | Fourth subcomponent Si | Fourth subcomponent Al |
|---|---|---|---|---|---|---|---|---|---|---|
| | | | | | | mol | | | | |
| 1-1 | 680 | 100 | 0 | 0.2 | 0.25 | 0.6 | 0.9 | 0.5 | 1.65 | 0.4 |
| 1-2 | 680 | 100 | 1 | 0.2 | 0.25 | 0.6 | 0.9 | 0.5 | 1.65 | 0.4 |
| 1-3 | 680 | 100 | 2 | 0.2 | 0.25 | 0.6 | 0.9 | 0.5 | 1.65 | 0.4 |
| 2-1 | 741 | 100 | 0 | 0.2 | 0.25 | 0.6 | 0.9 | 0.5 | 1.65 | 0.4 |
| 2-2 | 741 | 100 | 1 | 0.2 | 0.25 | 0.6 | 0.9 | 0.5 | 1.65 | 0.4 |
| 2-3 | 741 | 100 | 2 | 0.2 | 0.25 | 0.6 | 0.9 | 0.5 | 1.65 | 0.4 |
| 3-1 | 760 | 100 | 0 | 0.2 | 0.25 | 0.6 | 0.9 | 0.5 | 1.65 | 0.4 |
| 3-2 | 760 | 100 | 1 | 0.2 | 0.25 | 0.6 | 0.9 | 0.5 | 1.65 | 0.4 |
| 3-3 | 760 | 100 | 2 | 0.2 | 0.25 | 0.6 | 0.9 | 0.5 | 1.65 | 0.4 |

TABLE 2

| Embodiment | Sn content in boundary portion | Sn content in shell portion | Thickness of dielectric layer (μm) | Room temperature dielectric constant | DF (%) | TCC (%) (@−55° C.) | TCC (%) (@125° C.) | DC-bias @7 V/μm | MTTF (hrs) @150° C. 42, V/μm | Properties determination |
|---|---|---|---|---|---|---|---|---|---|---|
| 1-1 | X | X | 2.29 | 3148 | 6.4 | −21.2 | −10.9 | 922 | 95 | X |
| 1-2 | O | O | 2.30 | 3245 | 6.6 | −21.8 | −15.7 | 1017 | 128 | O |
| 1-3 | X | X | 2.31 | 3396 | 7.9 | −25.3 | −33.6 | 989 | 87 | X |
| 2-1 | X | X | 2.32 | 2938 | 6.5 | −20.7 | −13.1 | 985 | 100 | X |
| 2-2 | O | O | 2.30 | 3303 | 6.7 | −21.3 | −16.9 | 1087 | 133 | O |
| 2-3 | X | X | 2.30 | 3272 | 8.5 | −25.5 | −35.1 | 1057 | 80 | X |
| 3-1 | X | X | 2.32 | 2905 | 6.4 | −20.7 | −12.9 | 1049 | 76 | X |
| 3-2 | O | O | 2.29 | 4325 | 18.0 | −21.0 | −4.6 | 1158 | 25 | X |
| 3-3 | X | X | 2.31 | 6278 | 22.3 | −20.8 | 46.8 | 1125 | 8 | X |

In embodiments 1-1, 1-2, and 1-3 in the table, the sample in which the main component was BaTiO$_3$ of 100 mol, Sn was doped with 0 mol, 1 mol, and 2 mol respectively on the edge of the base BaTiO$_3$, the content of the element Mn of the first subcomponent was 0.2 mol, the content of element V was 0.25 mol, the content of the element Mg of the second subcomponent was 0.6 mol, the content of element Dy of the fourth subcomponent was 0.9 mol, the content of Tb was 0.5 mol, the content of the element Si of the 5th subcomponent was 1.65 mol, and the content of Al was 0.4 mol was fired in the firing atmosphere EMF 680 mV (hydrogen concentration 0.1%). Embodiments 1-1, 1-2, and 1-3 of Table 2 list the properties of the samples corresponding to this embodiment. Embodiment 1-1, in which Sn was not doped on the BaTiO$_3$ surface, had a dielectric constant of 3000 or more and satisfied X7S, but MTTF was less than 100 hours and did not satisfy the target properties. Embodiment 1-2 was prepared by doping 1 mol of Sn on the surface of BaTiO3, had a dielectric constant of 3000 or more, satisfied X7S, and had an MTTF of 100 hours or more, such that the target value was reached. However, properties ware not implemented in Sn doping exceeding this limit. Embodiment 1-3 was manufactured by doping the surface of BaTiO$_3$ with 2 mol of Sn, and the dielectric constant was increased compared to embodiments 1-1 and 1-2, but did not satisfy X7S and MTTF.

Similarly, in embodiments 2-3 and 3-3, the surface of BaTiO$_3$ was doped with 2 mol of Sn and firing was performed in a firing atmosphere EMF of 741 mV (hydrogen concentration: 0.3%) and 760 mV ((hydrogen concentration: 0.5%), and the dielectric constant met the target, but the X7S and MTTF was not satisfied. Accordingly, it may be confirmed that appropriate Sn doping (1 mol) may be necessary to reach the target.

Also, in the embodiment 2-2, the surface of BaTiO$_3$ was doped with 1 mol of Sn and firing was performed in a firing atmosphere EMF 741 mV (hydrogen concentration: 0.3%). The dielectric constant satisfied the target, X7s, and MTTF were the most excellent.

TABLE 3

| Embodiment | Firing temperature (°C.) | Main component BaTiO$_3$ mol | Content of doped Sn (mol) | Sheet thickness (μm) | First subcomponent Mn | First subcomponent V | Second subcomponent Mg | Third subcomponent Dy | Third subcomponent Tb | Fourth subcomponent Si | Fourth subcomponent Al |
|---|---|---|---|---|---|---|---|---|---|---|---|
| | | | | | | | mol | | | | |
| 4-1 | 1160 | 100 | 1 | 3.1 | 0.2 | 0.25 | 0.6 | 0.9 | 0.5 | 1.65 | 0.4 |
| 4-2 | 1167 | 100 | 1 | 3.1 | 0.2 | 0.25 | 0.6 | 0.9 | 0.5 | 1.65 | 0.4 |
| 4-3 | 1178 | 100 | 1 | 3.1 | 0.2 | 0.25 | 0.6 | 0.9 | 0.5 | 1.65 | 0.4 |
| 5-1 | 1160 | 100 | 1 | 3.2 | 0.2 | 0.25 | 0.6 | 0.9 | 0.5 | 1.65 | 0.4 |
| 5-2 | 1167 | 100 | 1 | 3.2 | 0.2 | 0.25 | 0.6 | 0.9 | 0.5 | 1.65 | 0.4 |
| 5-3 | 1178 | 100 | 1 | 3.2 | 0.2 | 0.25 | 0.6 | 0.9 | 0.5 | 1.65 | 0.4 |
| 6-1 | 1160 | 100 | 1 | 3.3 | 0.2 | 0.25 | 0.6 | 0.9 | 0.5 | 1.65 | 0.4 |
| 6-2 | 1167 | 100 | 1 | 3.3 | 0.2 | 0.25 | 0.6 | 0.9 | 0.5 | 1.65 | 0.4 |
| 6-3 | 1178 | 100 | 1 | 3.3 | 0.2 | 0.25 | 0.6 | 0.9 | 0.5 | 1.65 | 0.4 |

TABLE 4

| Embodiment | Sn content in boundary portion | Sn content in shell portion | Dielectric thickness (μm) | Room temperature dielectric constant | DF (%) | TCC (%) (@−55° C.) | TCC (%) (@125° C.) | DC-bias @7 V/μm | MTTF (hrs) @150° C., 42 V/μm | properties determination |
|---|---|---|---|---|---|---|---|---|---|---|
| 4-1 | ○ | ○ | 2.21 | 3255 | 6.7 | −20.8 | −16.7 | 1031 | 82 | X |
| 4-2 | ○ | ○ | 2.25 | 3354 | 6.9 | −20.8 | −17.2 | 1049 | 89 | X |
| 4-3 | ○ | ○ | 2.25 | 3622 | 8 | −21.2 | −17.9 | 1010 | 83 | X |
| 5-1 | ○ | ○ | 2.29 | 3041 | 6.5 | −20.4 | −16.2 | 1027 | 125 | ○ |
| 5-2 | ○ | ○ | 2.3 | 3303 | 6.7 | −21.3 | −16.9 | 1087 | 133 | ○ |
| 5-3 | ○ | ○ | 2.36 | 3545 | 7.7 | −21.4 | −18.1 | 1059 | 122 | ○ |
| 6-1 | ○ | ○ | 2.41 | 3280 | 6.4 | −20.9 | −15.7 | 1160 | 170 | ○ |
| 6-2 | ○ | ○ | 2.40 | 3408 | 6.7 | −21.3 | −16.8 | 1167 | 174 | ○ |
| 6-3 | ○ | ○ | 2.46 | 3785 | 7.7 | −21.7 | −17.5 | 1173 | 172 | ○ |

In embodiments 4-1, 4-2, and 4-3 in table 3, a sheet thickness of 3.1 μm was fabricated using BaTiO$_3$ doped with 1 mol of Sn, and firing was performed in firing atmosphere EMF 741 mV (hydrogen concentration 0.3%), firing temperature 1160 to 1178° C. The thickness of the dielectric layer of the manufactured chip was 2.2 μm to 2.25 μm. These samples had a dielectric constant of 3200 or more, a dielectric constant of 1000 or more at DC 7 V/μm, and satisfied X7S, but the MTTF did not reach 100 hours. However, in embodiments 5-1 to 5-3 and 6-1 to 6-3 in which the sheet thickness was 3.2 μm and 3.3 μm and the dielectric thickness was 2.29 μm to 2.46 μm after firing, the dielectric constant was 3000 or more, dielectric constant at DC 7 V/μm was over 1000, X7S was satisfied, and MTTF was over 100 hours, satisfying the target properties. Accordingly, it may be confirmed that an appropriate thickness of the dielectric layer may be necessary to implement the properties.

The thickness of the internal electrodes in embodiments 4-1 to 6-3 satisfied 1.0 μm or less, and the connectivity of the internal electrodes corresponded to 90% or more. Specifically, the thickness of the internal electrode was 0.781 μm in embodiment 4-1, 0.791 μm in embodiment 4-2, 0.823 μm in embodiment 4-3, 0.827 μm in embodiment 5-1, 0.801 μm in embodiment 5-2, 0.771 μm in embodiment 5-3, 0.814 μm in embodiment 6-1, 0.787 μm in embodiment 6-2, and 0.824 μm in embodiment 6-3.

TABLE 5

| Embodiment | Firing temperature (° C.) | main component BaTiO$_3$ | Content of doped Sn | First subcomponent Mn | First subcomponent V | Second subcomponent Mg | Third subcomponent Dy | Third subcomponent Tb | Fourth subcomponent Si | Fourth subcomponent Al |
|---|---|---|---|---|---|---|---|---|---|---|
| | | | | | | mol | | | | |
| 8-1 | 1167 | 100 | 1 | 0.24 | 0.3 | 0.6 | 0.9 | 0.5 | 1.65 | 0.4 |
| 8-2 | 1167 | 100 | 1 | 0.2 | 0.25 | 0.6 | 0.9 | 0.5 | 1.65 | 0.4 |
| 8-3 | 1167 | 100 | 1 | 0.19 | 0.24 | 0.6 | 0.9 | 0.5 | 1.65 | 0.4 |
| 8-4 | 1167 | 100 | 1 | 0.18 | 0.23 | 0.6 | 0.9 | 0.5 | 1.65 | 0.4 |
| 8-5 | 1167 | 100 | 1 | 0.17 | 0.21 | 0.6 | 0.9 | 0.5 | 1.65 | 0.4 |
| 9-1 | 1167 | 100 | 1 | 0.20 | 0.25 | 0.3 | 0.9 | 0.5 | 1.65 | 0.4 |
| 9-2 | 1167 | 100 | 1 | 0.20 | 0.25 | 0.45 | 0.9 | 0.5 | 1.65 | 0.4 |
| 9-3 | 1167 | 100 | 1 | 0.20 | 0.25 | 0.75 | 0.9 | 0.5 | 1.65 | 0.4 |
| 10-1 | 1167 | 100 | 1 | 0.20 | 0.25 | 0.6 | 1.1 | 0.3 | 1.65 | 0.4 |
| 10-2 | 1167 | 100 | 1 | 0.20 | 0.25 | 0.6 | 0.7 | 0.7 | 1.65 | 0.4 |
| 10-3 | 1167 | 100 | 1 | 0.20 | 0.25 | 0.6 | 0.5 | 0.9 | 1.65 | 0.4 |
| 11-1 | 1167 | 100 | 1 | 0.20 | 0.25 | 0.6 | 0.9 | 0.5 | 1.65 | 0.4 |
| 11-2 | 1167 | 100 | 1 | 0.20 | 0.25 | 0.6 | 0.9 | 0.5 | 2.15 | 0.4 |
| 11-3 | 1167 | 100 | 1 | 0.20 | 0.25 | 0.6 | 0.9 | 0.5 | 2.65 | 0.4 |

TABLE 6

| Embodiment | Chip properties | | | | | | | | | |
|---|---|---|---|---|---|---|---|---|---|---|
| | Sn content in boundary portion | Sn content in shell portion | Dielectric thickness (μm) | Room temperature dielectric constant | DF (%) | TCC (%) (@−55° C.) | TCC (%) (@125° C.) | DC-bias @7 V/μm | MTTF (hrs) @150° C., 42 V/μm | properties determination |
| 8-1 | ○ | ○ | 2.30 | 3088 | 6.5 | −21.8 | −18.6 | 1095 | 111 | ○ |
| 8-2 | ○ | ○ | 2.30 | 3303 | 6.7 | −21.3 | −16.9 | 1087 | 133 | ○ |
| 8-3 | ○ | ○ | 2.30 | 3425 | 6.7 | −21.4 | −18.6 | 1085 | 126 | ○ |
| 8-4 | ○ | ○ | 2.31 | 3617 | 6.7 | −21.4 | −20.9 | 1082 | 112 | ○ |
| 8-5 | ○ | ○ | 2.31 | 3740 | 6.8 | −22.2 | −22.5 | 1046 | 87 | X |
| 9-1 | ○ | ○ | 2.38 | 3053 | 6.9 | −20.9 | −17.8 | 1071 | 108 | ○ |
| 9-2 | ○ | ○ | 2.36 | 3130 | 6.8 | −20.2 | −18.4 | 1080 | 109 | ○ |
| 9-3 | ○ | ○ | 2.27 | 3081 | 6.2 | −22.1 | −21.4 | 1088 | 121 | X |
| 10-1 | ○ | ○ | 2.33 | 3128 | 6.6 | −21.0 | −14.5 | 1106 | 101 | ○ |
| 10-2 | ○ | ○ | 2.33 | 3102 | 6.4 | −21.0 | −15.2 | 1096 | 126 | ○ |
| 10-3 | ○ | ○ | 2.31 | 3406 | 6.4 | −22.1 | −23.8 | 1098 | 81 | X |
| 11-1 | ○ | ○ | 2.30 | 3303 | 6.7 | −21.3 | −16.9 | 1087 | 133 | ○ |
| 11-2 | ○ | ○ | 2.29 | 3125 | 6.6 | −20.8 | −13.2 | 1055 | 103 | ○ |
| 11-3 | ○ | ○ | 2.31 | 3009 | 6.3 | −20.5 | −10.6 | 1069 | 130 | ○ |

In embodiments 8-1 to 8-3, 9-1 to 9-3, 10-1 to 10-3, and 11-1 to 11-3 in Table 5, 1 mol of Sn was doped into 100 mol of main component $BaTiO_3$, and the contents of the first subcomponent, the second subcomponent, the third subcomponent, and the fourth subcomponent were changed. The properties of the samples corresponding to these embodiments are listed in Table 6.

Embodiments 8-1 to 8-3 were tested by changing the total content of Mn and V, which were the first subcomponents, and the total was in the range of 0.383 mol to 0.54 mol. As a result of this, the target properties may be realized in the range of the content of the first subcomponent, from 0.405 mol to 0.54 mol.

Embodiments 9-1 to 9-3 were tested by changing the content of Mg, the second subcomponent, from 0.3 mol to 0.75 mol, and MTTF and other target properties were realized at 0.75 mol, but X7S was not satisfied. However, in the range of 0.3 mol to 0.6 mol, target properties were realized.

Embodiments 10-1 to 10-3 were tested by adjusting the ratio of Tb and Dy such that the total content of the rare earth element, which is the third subcomponent, was 1.4 mol, and at Dy/Tb=0.5/0.9=0.56, MTTF was less than 100 hours and X7S was not satisfied, such that target properties was not realized. However, when Dy/Tb was 0.7/0.7=1 and 0.9/0.5=1.8, target properties were realized.

Embodiments 11-1 to 11-3 was tested in the range of the fourth subcomponent Si content of 1.65 mol to 2.65 mol, the dielectric constant was 3000 or more, the dielectric constant at DC 7V/μm was 1000 or more, X7S was satisfied, MTTF was over 100 hours, such that the target properties was implemented According to the aforementioned example embodiments, a room temperature dielectric constant may be improved.

Also, the dielectric constant may be improved when high pressure is applied.

Also, the X7S temperature properties may be satisfied.

Also, MTTF may be improved when high temperature and high pressure are applied.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and internal electrodes; and
an external electrode disposed on the body,
wherein the dielectric layer includes a boundary portion, which is adjacent to the internal electrodes, and
wherein the boundary portion includes a region satisfying an atomic ratio: 1.0%≤Sn/(Ba+Ti+Sn)≤1.5%, and
the internal electrode includes a region adjacent to the dielectric layer, satisfying an atomic ratio: 0%≤Sn/(Ba+Ti+Sn)≤0.5%.

2. The multilayer electronic component of claim 1, wherein the boundary portion is a region within 30 nm from the boundary with the internal electrode.

3. The multilayer electronic component of claim 1, wherein the dielectric layer includes a $BaTiO_3$-based main component and a subcomponent.

4. The multilayer electronic component of claim 3, wherein the subcomponent includes a first subcomponent including a valence variable acceptor element, wherein the valence variable acceptor element includes one or more of Mn, V, Cr, Fe, Ni, Co, Cu, and Zn, and wherein a number of moles of elements included in the first subcomponent is 0.4 moles or more and 0.55 moles or less based on 100 moles of Ti.

5. The multilayer electronic component of claim 3, wherein the subcomponent includes a second subcomponent including Mg, and
wherein a number of moles of elements included in the second subcomponent is 0.3 moles or more and 0.6 moles or less based on 100 moles of Ti.

6. The multilayer electronic component of claim 3, wherein the subcomponent includes a third subcomponent including a rare earth element,
wherein the rare earth element includes one or more of Y, Dy, Tb, Ho, Er, Gd, Ce, Nd, Sm, Tm, La, and Yb, and
wherein a number of moles of elements included in the third subcomponent is 1.3 moles or more and 1.5 moles or less based on 100 moles of Ti.

7. The multilayer electronic component of claim 3, wherein the subcomponent includes a fourth subcomponent including at least one of Si or Al, and
wherein a number of moles of elements included in the fourth subcomponent is 2.15 moles or more and 3.15 moles or less based on 100 moles of Ti.

8. The multilayer electronic component of claim 1, wherein the dielectric layer includes a plurality of dielectric grains,
wherein at least one of the plurality of dielectric grains includes a core-shell structure including an core portion and a shell portion covering at least a portion of the core portion, and
wherein the core portion includes a region satisfying an atomic ratio: 0%<Sn/(Ba+Ti+Sn)≤0.5%.

9. The multilayer electronic component of claim 8, wherein the shell portion includes a region satisfying an atomic ratio: 0.5%<Sn/(Ba+Ti+Sn)≤5.0%.

10. The multilayer electronic component of claim 8, wherein a size of at least one core portion of dielectric grains of the core-shell structure is 120 nm or more and 160 nm or less.

11. The multilayer electronic component of claim 8, wherein an average size of the plurality of dielectric grains is 140 nm or more and 260 nm or less.

12. The multilayer electronic component of claim 1, wherein the dielectric layer includes a plurality of dielectric layers, and
wherein a thickness of at least one of the plurality of dielectric layers is 2.1 μm or more and 2.5 μm or less.

13. The multilayer electronic component of claim 1, wherein the multilayer electronic component satisfies at least one of the following properties: room temperature dielectric constant≥3000, DC-bias dielectric constant≥1000 at 7V/μm, −22%≤ΔC % (TCC)≤+22% in a temperature range from −55° C. to 125° C., and MTTF≥100 hours under an accelerated test condition in which an electric field of 42 V/μm is applied at a temperature of 150° C.

14. The multilayer electronic component of claim 1, a thickness of at least one of the plurality of dielectric layers is 2.1 μm or more and 2.5 μm or less.

15. A multilayer electronic component, comprising:
a body including a plurality of dielectric layers and a plurality of internal electrodes; and
external electrodes disposed on the body,
wherein at least one of the plurality of dielectric layers includes a plurality of dielectric grains, and at least one of the plurality of dielectric grains includes a core-shell structure including a core portion and a shell portion covering at least a portion of the core portion, wherein all of the core-shell grains included in the dielectric layer include the shell portion including a region satisfying an atomic ratio: $0.5\% < Sn/(Ba+Ti+Sn) \leq 5.0\%$.

16. The multilayer electronic component of claim 15, wherein at least one of the plurality of dielectric layer includes a boundary portion, a region adjacent to a boundary with the internal electrode, and wherein the boundary portion includes a region satisfying an atomic ratio: $1.0\% \leq Sn/(Ba+Ti+Sn) \leq 1.5\%$.

17. The multilayer electronic component of claim 16, wherein the boundary portion is a region within 30 nm from a boundary with the internal electrode.

* * * * *